(12) United States Patent
Sullivan et al.

(10) Patent No.: US 7,430,715 B2
(45) Date of Patent: Sep. 30, 2008

(54) INTERFACE FOR INDICATING THE PRESENCE OF INHERITED VALUES IN A DOCUMENT

(75) Inventors: Dave L. Sullivan, Canoga Park, CA (US); David E. Brookler, Los Angeles, CA (US); Paul N. Weinberg, Los Angeles, CA (US); Philip A. Tinari, Los Angeles, CA (US); Richard T. Endo, Los Angeles, CA (US); Nathan F. Yospe, Los Angeles, CA (US)

(73) Assignee: SAP, Aktiengesellschaft, Walldorf (DE)

( * ) Notice: Subject to any disclaimer, the term of this patent is extended or adjusted under 35 U.S.C. 154(b) by 526 days.

(21) Appl. No.: 11/141,984

(22) Filed: May 31, 2005

(65) Prior Publication Data

US 2006/0271868 A1 Nov. 30, 2006

(51) Int. Cl.
*G06F 17/00* (2006.01)
(52) U.S. Cl. ...................................... 715/255
(58) Field of Classification Search .............. 715/530, 715/500, 200, 234, 255
See application file for complete search history.

(56) References Cited

U.S. PATENT DOCUMENTS

| | | | | |
|---|---|---|---|---|
| 6,542,898 | B1* | 4/2003 | Sullivan et al. | 707/102 |
| 6,711,740 | B1* | 3/2004 | Moon et al. | 719/328 |
| 6,772,165 | B2* | 8/2004 | O'Carroll | 707/101 |
| 2002/0002567 | A1* | 1/2002 | Kanie et al. | 707/513 |
| 2002/0049831 | A1* | 4/2002 | Platner et al. | 709/218 |
| 2002/0069049 | A1* | 6/2002 | Turner | 704/8 |
| 2002/0162093 | A1* | 10/2002 | Zhou et al. | 717/130 |
| 2003/0012558 | A1* | 1/2003 | Kim et al. | 386/97 |
| 2003/0093755 | A1* | 5/2003 | O'Carroll | 715/500 |
| 2005/0086579 | A1* | 4/2005 | Leitner et al. | 715/500 |
| 2006/0041428 | A1* | 2/2006 | Fritsch et al. | 704/257 |
| 2006/0217960 | A1* | 9/2006 | Kato et al. | 704/2 |
| 2006/0268107 | A1* | 11/2006 | Weinberg et al. | 348/143 |
| 2006/0271523 | A1* | 11/2006 | Brookler et al. | 707/3 |
| 2006/0288265 | A1* | 12/2006 | Brookler | 715/500 |
| 2007/0067297 | A1* | 3/2007 | Kublickis | 707/9 |
| 2007/0067728 | A1* | 3/2007 | Lo et al. | 715/751 |
| 2007/0157079 | A1* | 7/2007 | Baker | 715/515 |

OTHER PUBLICATIONS

Singh et al., Generating Association Rules from Semi-Structured Documents Using an Extended Concept Hierarchy, ACM 1997, pp. 193-200.*
Spragins, Developing Hypertext Documents for an International Audience, ACM 1992, pp. 27-34.*

* cited by examiner

*Primary Examiner*—Cong-Lac Huynh
(74) *Attorney, Agent, or Firm*—Dalina Law Group, P.C.

(57) ABSTRACT

An interface for indicating the presence of inherited values in a document. The interface enables a user to rapidly determine if an audience specific document conforms to the expectations or requirements of an intended audience. The interface distinguishes between current, primary and secondary audience layer values through the use of color or any other mechanism that allows a user to quickly identify data that is missing and needs to be populated, changed or remain unchanged if the inherited data is suitable for the given audience. Using the interface, users can determine at a glance what information is inherited and what level of inheritance that information is from. Before generating an audience specific document targeted at a particular media type, an audience hierarchy may be created and utilized for entry and edit of data for a desired audience.

17 Claims, 4 Drawing Sheets

Figure 2

| Record Detail | Language Detail | Family Detail | Validations | Workflow | Search Selections |

| | English [US] | English [UK] | Japanese [JA] |
|---|---|---|---|
| Description | Kodachrome Professional Slide Film | Kodachrome Professional Slide Film | Kodachrome の専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダーは Excellent natural color quality with superior |
| Pictures |  | 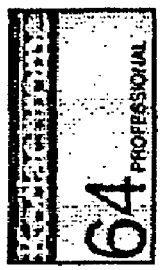 | 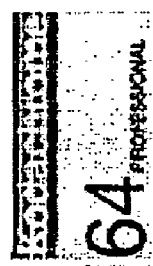 |
| Spec Sheets | | | |

250

200 — Description
201 — Category
202 — Manufacturer
203 — Long Description
204 — Pictures

Figure 3

The Audience Layer Operator with Multiple Audience Layers

| language layer | True if... Non-Lookup / Lookup Field | | | | | | | | Multi-Valued Lookup Field <across the set of all links> |
|---|---|---|---|---|---|---|---|---|---|
| | 0 | 1 | 2 | 3 | 4 | 5 | 6 | 7 | |
| has value | | • | • | | • | • | • | | no missing values |
| is missing value | • | | | | | | • | • | any missing value |
| inherits primary | | | • | • | | | | | any inherits primary |
| inherits secondary | | • | | | | | | | any inherits secondary |
| inherits any | | • | • | • | | | | | any inherits any |
| does not inherit | • | | | | • | • | • | • | no inherited values |

INTERFACE FOR INDICATING THE PRESENCE OF INHERITED VALUES IN A DOCUMENT

BACKGROUND OF THE INVENTION

1. Field of the Invention

Embodiments of the invention described herein pertain to the field of computer systems. More particularly, but not by way of limitation, one or more embodiments of the invention enable a user to visually determine whether or not a document will conform to the expectations or requirements of at least one audience comprising language, regional, regulatory and/or cultural differences.

2. Description of the Related Art

Generating a document for multiple audiences wherein each document is made available in multiple media types using current technology is a time consuming and expensive undertaking. Audiences may have unique language, regional, regulatory and/or cultural characteristics but may be similar and may make use of large portions of the data associated with a similar audience. Media type may comprise markup based documents that are capable of being displayed in a web browser and may also comprise print based media such as for example a paper based catalog.

A document that is targeted to more than one language may also need to take into account the different regional, regulatory, and cultural requirements of the audience for which the document is published. For an audience that is similar to another audience, there is a significant amount of duplicate data entry in addition to the specific modifications required for each intended audience. When underlying data changes, it is not necessarily clear as to what data should be updated in each audience specific document since a specific piece of data may have already been changed to conform to a specific audience. In addition, the generated document needs to be properly formatted regardless of the media type for which the document is generated. Formatting the document for each media type is also time consuming and requires large amounts of maintenance when the data in each version of the document changes further requiring checking the generated documents in each media type to ensure proper formatting.

Current systems for generating documents simply do not provide an easy method for generating multi-audience documents for multiple output media types. When publishing documents for a global audience, data that is an appropriate substitute in one instance of the-document may not be an adequate substitute in a different instance. French regulations, for instance, prohibit imagery that shows a hypodermic needle whereas in other countries such images are permissible. The same concept is also applicable to language, cultural, and regional or regulatory requirements associated with a particular document. Current systems provide mechanisms for publishing documents in multiple languages, but require brute force entry of multi-lingual data in a way that tends require large amounts of duplicate operator entries for similar languages, cultural, regional or regulatory specific embodiments of a document. For example, current systems require a complete set of entries for two languages that may only differ in a small way such as United Kingdom and United States English. In addition, the interfaces of the systems allowing for data entry cannot provide visual clues as to the data used or to missing for a given audience since there is no concept of inheritance in current systems. Hence, current systems for generating documents fail to enable the user to determine whether or not a document conforms to the expectations or requirements of its intended audience in a visual manner that allows a user to quickly ensure that each regional, regulatory and cultural difference is accounted for in the final generated document.

Furthermore, generating a document for alternate media types requires data that defines the required output format for the particular media type. Current systems that perform this function are generally hardcoded and when a particular piece of data changes, all target media documents must be manually adjusted and further adjusted for each media output type as well.

For at least the limitations described above there is a need for a system that quickly enables a user to determine whether or not the document conforms to the expectations or requirements of its intended audience in a visual manner.

SUMMARY OF THE INVENTION

One or more embodiments of the invention provide an interface for indicating the presence of inherited values in a document. Thus, the interface enables a user to rapidly determine if an audience specific document conforms to the expectations or requirements of an intended audience. The word "audience" for the purposes of this specification means a group of document consumers such as people or computers that are associated with a language, country, region, regulation or culture. The interface makes use of rule-based inheritance in creating and editing data used in generating a document targeted at a plurality of audiences. One or more embodiments of the invention comprise a user interface that distinguishes between current audience layer values, primary audience inheritance values, and secondary audience inheritance values through the use of color or any other mechanism that allows a user to quickly identify data that is missing and needs to be populated, changed or remain unchanged if the inherited data is suitable for the given audience. Using the interface described, users can determine at a glance what information is inherited and what level of inheritance that information is from. The use of the layers of inheritance is exemplary and the use of more or less than the three layers of inheritance described is in keeping with the spirit of the invention.

Before generating an audience specific document targeted at a particular media type, an audience hierarchy may be created and utilized for entry and edit of data for a desired audience. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not altered when adding an audience, attributes are added where needed to the attribute table and an audience is defined in the audience table.

Once the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values. A document may be published at any time using the data entered and edited in the system.

Entry of data for a given audience may comprise entering a small amount of data if the audience may be based extensively on another audience. By viewing the data and the associated color or other visual representation associated with an audience, the minimal amount of data entries may be made to take advantage of other existing audience data. The visual representation may involve the color black for the primary layer, green for the first inheritance layer and red for a secondary inheritance layer. In this case, when viewing the data under a current audience setting, text for another audience that is inherited from the current audience would be green, and text for an audience that uses the current audience data as a secondary inheritance layer would be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic.

Data integrity is maintained in one or more embodiments of the invention through legal value lists during data entry, limited value lists during searches, predefined measurement fields and attributes, color coded field values, the ability to search for NULL values using drill down or free-form search, usage tabs that show the set of records to which each object is linked or to the categories to which an attribute is linked, in-place taxonomy editing, automatic change detection for determining if a change would alter the integrity of the data and product masks that allow for subsets of the master data to be published without requiring duplicate data entry for each publication. In addition to these methods of maintaining data integrity, inheritance value promotion is utilized in order to minimize the amount of data required for entry to support the desired audiences.

Keyword searching may be utilized in one or more embodiments to search only the current audience layer and the primary inherited audience layer. This allows for searching in what will be the generated document data only. Other embodiments of the invention allow for the level in which to keyword search to be set to any desired level. In multi-audience data sets, use of an "is NULL" operator when searching returns non-lookup fields that have all associated audience inheritance levels set to NULL or lookup fields that do not link to a sub-table. One or more embodiments of the invention may comprise complete control over the exact layer in which to search for NULL values using a bit flag in the search. For a three level inheritance embodiment, there are 8 permutations involving a NULL value in at least one of the layers, instead of making the user calculate the proper mask, the Current Audience Layer mask can be logical Oared with the Primary Audience Layer Mask or the Secondary Audience Layer Mask in order to create the desired search combination. In addition, predefined audience layer operators may also be used comprising "has value", "is missing value", "inherits primary", "inherits secondary", "inherits any", "does not inherit". "Has value" and "is missing value" are complementary functions used to determine if the current audience layer comprises a value or whether the converse is true. For lookup fields these functions are used in order to check for values or missing values across the set of all links. "Inherits primary" returns a match when the current audience layer inherits a value from either the primary or secondary audience layer and "inherits secondary" returns a match when the current audience layer inherits from only the secondary audience layer, while "inherits any" returns a match when either of the previous two cases is true. "Does not inherit" returns a match when there is a current audience layer value for non-lookup fields or when all layers are null.

When importing data, the import can be directed to a particular audience layer. In this manner the supported audiences may be built up from external programs or data sources and independently entered into the system. Exporting data may comprise exporting a particular audience layer or exporting all audience layers. Import and export may make use of existing file formats and applications from various software manufacturers.

One or more embodiments of the invention may utilize database tables or memory structures or any combination of tables or structures in storing data associated with audiences or data relating to the audience metadata. Audience specific documents may be generated for publication by obtaining an audience identifier from an audience order table or structure. The audience identifier specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. Although the system utilized for data entry and edit may show secondary inheritance audience layers in red for example, the generated document itself may not be generated using any secondary inheritance values in one or more embodiments of the invention.

Adding support for document for a given audience using embodiments of the invention is rapid as there is no need to add multiple rows for each entry in the main data table or add and populate fields in a main data table for each new audience. The data attribute table may be augmented with only those values that are unique to the new audience with respect to a set of data values corresponding to an audience that already exists in the data table. Since values for different audience inheritance levels are shown with different visual representations, the choice of data to enter or edit is performed by determining whether inherited values for a given audience are appropriate for the current audience. Edit of a primary inherited layer data value converts the entry to a current layer value since the data value entered no longer inherits from another layer, therefore the visual representation of the data value changes to reflect this level advancement.

BRIEF DESCRIPTION OF THE DRAWINGS

FIG. 2 illustrates an audience detail view for an embodiment of the data entry and edit application comprising a plurality of audience layer data values.

FIG. 3 illustrates the audience layer operator for searching multiple audiences.

DETAILED DESCRIPTION OF THE INVENTION

An interface for indicating the presence of inherited values in a document will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
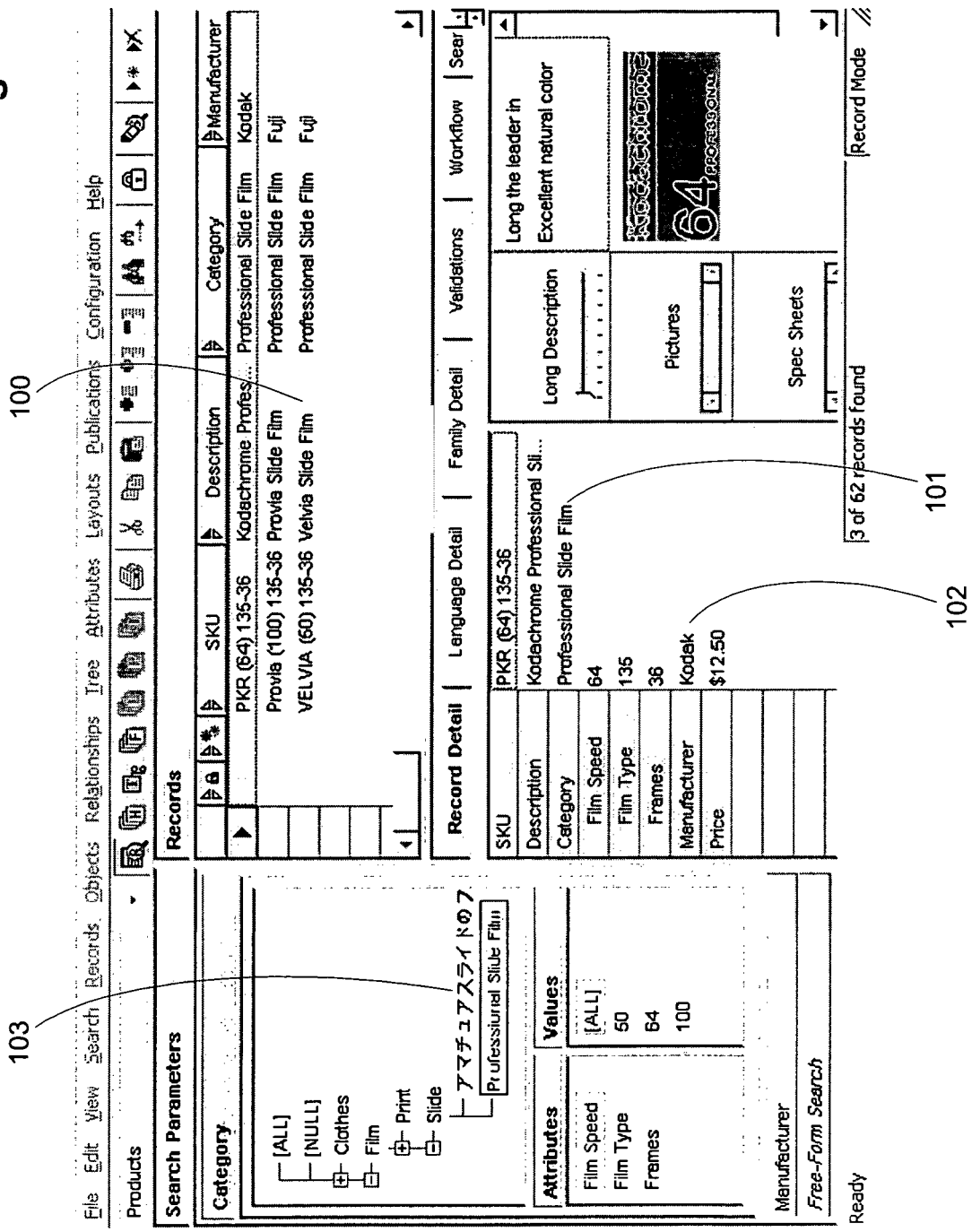
FIG. 1 illustrates a record view for an embodiment of the data entry and edit application comprising a plurality of audience layer data values.

FIG. 1 illustrates a record view for an embodiment of the data entry and edit application comprising a plurality of audience layer data values. This view illustrates an interface for indicating the presence of inherited values in a document. Description value 100 for example may be green in order to show that the value is inherited from another audience layer. The current record selected is shown in the bottom right area of the screen shot. Category value 101 may also be in green to denote that the value is inherited from another audience layer along with Manufacture value 102. Category value 103 may be displayed in red to indicate that there is no current audience layer value, or no primary inheritance layer value. This could also be true of any of the other data values or metadata values displayed. Thus, the interface enables a user to rapidly determine if an audience specific document conforms to the expectations or requirements of an intended audience.

FIG. 2 illustrates an audience detail view for an embodiment of the data entry and edit application comprising a plurality of audience layer data values. The interface makes use of rule-based inheritance in creating and editing data used in generating a document targeted at a plurality of audiences. One or more embodiments of the invention comprise a user interface that distinguishes between current audience layer values as shown in the English [US] column, primary audience inheritance values as shown in the English [UK] column, and secondary audience inheritance values shown in the Japanese [JA] column. In this example, English [US] is the current audience layer, English [UK] is the primary audience layer and Japanese [JA] is the secondary audience layer. Through the use of color or any other mechanism that allows a user to quickly identify data that is missing and needs to be populated, changed or remain unchanged if the inherited data is suitable for the given audience. Using the interface described, users can determine at a glance what information is inherited and what level of inheritance that information is from. Assuming that the current audience setting is English [US] for example, the English [US] column comprises data values that may generally be all black if the English [US] audience is the predominantly populated audience. Certain values may appear green or red if for example they are not found in the English [US] layer and are obtained from another audience layer. This applies to Description values 200, Category values 201, Manufacturer values 202 and Long Description values 203 or any other text based values the column may comprise. Picture values 204 may comprise borders around the pictures that are black, green or red to indicate the audience layer that they are inherited from. One or more embodiments of the invention may comprise an audience detail tab as opposed to a language detail tab if the audiences are split based on characteristics other than simply language.

Before entering and editing the data for an audience specific document targeted at a particular media type, an audience hierarchy may be created and utilized for entry and edit of data for a desired audience data. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not altered when adding an audience, attributes are added where needed to the attribute table and an audience is defined in the audience table. When running the application for data entry and edit, and before generating a document, secondary inheritance values may be searched for in order to ensure that the generated document comprises values from the current audience layer or primary inheritance layer only.

Figure 4:
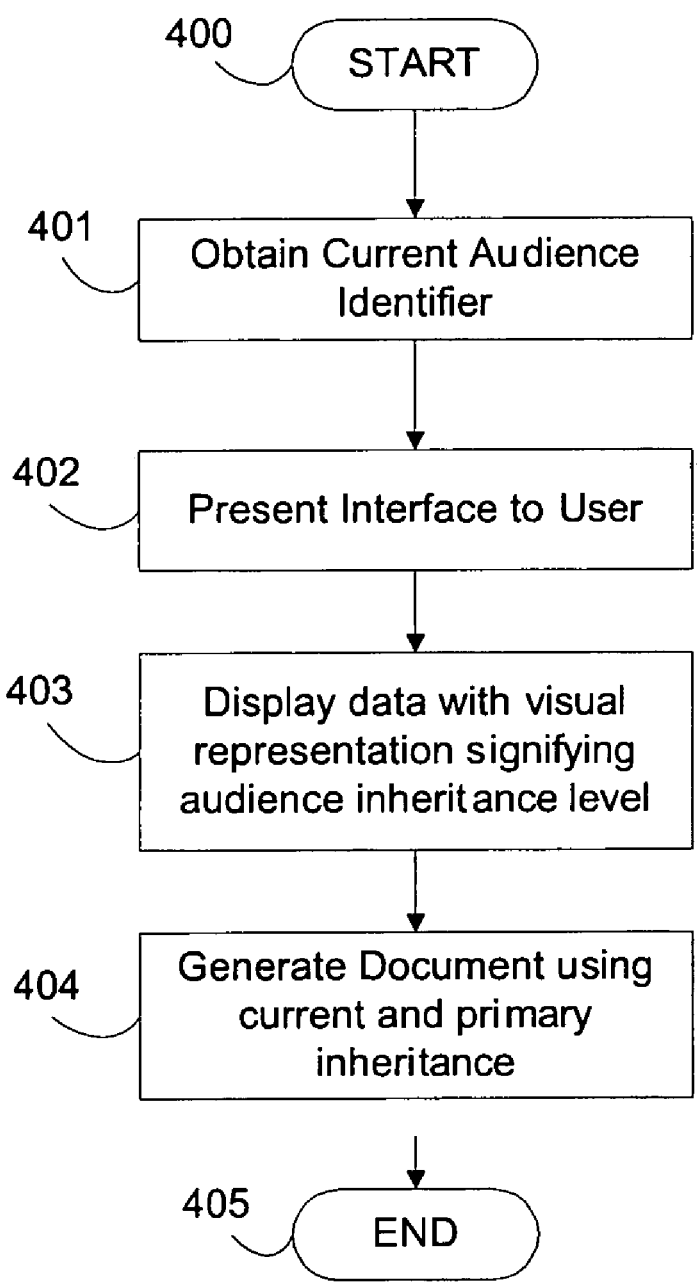
FIG. 4 illustrates a method for utilizing an interface for indicating the presence of inherited values in a document.

Once the audience hierarchy is set up, entry and edit of data occurs in one or more embodiments of the invention after selecting a given audience identifier for interaction with the system. FIG. 4 illustrates a method for utilizing an interface for indicating the presence of inherited values in a document. The audience identifier may be entered manually or automatically from the user or computer associated with a user at 401. The audience identifier may specify the language, or the language and country, or the language, country and region, or the language, region and culture, or the culture and regulatory area or any other combination of audience identifying values. The interface is presented to the user at 402 initially without values present until the data is loaded. The data is displayed to the user with a visual representation signifying the audience inheritance level of the data with respect to the current audience identifier at 403. Certain portions of the data entry and edit application may show more than one audience data set simultaneously for rapid viewing of multiple audiences. Optionally, editing values, importing and exporting and other operations on specific audience layers such as search with audience operator functions may occur after the data is displayed in the system. At least one document is then generated for each audience desired and may be generated in multiple media output formats at 404. The process ends when the user is satisfied that the documents have been correctly generated or at any other time at 405.

Entry of data for a given audience may comprise entering a small amount of data if the audience may be based extensively on another audience. For example in FIG. 2 in Long Description values 203 for column English [UK], although the cell may be displaying green to denote that it is obtaining its value from the English [US] audience layer, it may be altered in place for the English [UK] audience by changing the description to comprise the word "colour" instead of "color" and saving the data change. Since the visual representation may utilize the color black for the primary layer, green for the first inheritance layer and red for a secondary inheritance layer, then the value would change to black since the value is set within the English [UK] audience and is no longer inherited. Furthermore, if the only difference in data between the English [US] audience and the English [UK] audience for the particular document was Long Description values 203, then the English [UK] audience would be added with minimal effort.

FIG. 3 illustrates the audience layer operator for searching multiple audiences. Keyword searching may be utilized in one or more embodiments to search only the current audience layer and the primary inherited audience layer. This allows for searching in what will be the generated document data only. Other embodiments of the invention allow for the level in which to keyword search to be set to any desired level. In multi-audience data sets, use of an "is NULL" operator when searching returns non-lookup fields that have all associated audience inheritance levels set to NULL or lookup fields that do not link to a sub-table. One or more embodiments of the invention may comprise complete control over the exact layer in which to search for NULL values using a bit flag in the search. For a three level inheritance embodiment, there are 8 permutations involving a NULL value in at least one of the layers, instead of making the user calculate the proper mask, the Current Audience Layer mask can be logical Oared with the Primary Audience Layer Mask or the Secondary Audience Layer Mask in order to create the desired search combination. In addition, predefined audience layer operators may also be used comprising "has value" as per row 1 of FIG. 3, "is missing value" as per row 2, "inherits primary" as per row 3, "inherits secondary" as per row 4, "inherits any" as per row 5, and "does not inherit" as per row 6. These predefined masks save the user from generating a bit mask for searching by hand. "Has value" and "is missing value" are complementary functions used to determine if the current audience layer comprises a value or whether the converse is true. For lookup fields these functions are used in order to check for values or missing values across the set of all links. "Inherits primary" returns a match when the current audience layer inherits a value from either the primary or secondary audience layer and "inherits secondary" returns a match when the current audience layer inherits from only the secondary audience layer, while "inherits any" returns a match when either of the previous two cases is true. "Does not inherit" returns a match when there is a current audience layer value for non-lookup fields or when all layers are null.

When importing data, the import can be directed to a particular audience layer. In this manner the supported audiences may be built up from external programs or data sources and independently entered into the system. Exporting data may comprise exporting a particular audience layer or exporting all audience layers. Import and export may make use of existing file formats and applications from various software manufacturers. Use of a dialog that comprise the audience layer to utilize in importing or exporting allows for the user to specific the particular audience layer for import or export.

One or more embodiments of the invention may utilize database tables or memory structures or any combination of tables or structures in storing data associated with audiences or data relating to the audience metadata. Audience specific documents may be generated for publication by obtaining an audience identifier from an audience order table or structure. The audience identifier specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. Although the system utilized for data entry and edit may show secondary inheritance audience layers in red for example, the generated document itself may not be generated using any secondary inheritance values in one or more embodiments of the invention.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. Pat. application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference. PLUS THE LATEST ONES While the invention herein disclosed has been described by means of specific embodiments and applications thereof, numerous modifications and variations could be made thereto by those skilled in the art without departing from the scope of the invention set forth in the claims.

What is claimed is:

1. In a computer system, a method comprising:
providing a user interface comprising a plurality of fields for displaying audience data for a first audience:
obtaining a current audience identifier from a user using said user interface, said current audience identifier indicative of a current audience inheritance level:
selecting a set of audience data from all said audience data to populate said plurality of fields, wherein said set of audience data is selected for its closest conespondence to said current audience inheritance level;
displaying said selected audience data on said user interface with a plurality of visual representations, each indicative of said current audience inheritance level for each of said plurality of fields; and,
generating a first audience specific document comprising said selected audience data.

2. The method of claim 1 wherein said selected audience data comprises data corresponding to a plurality of audience inheritance levels.

3. The method of claim 1 further comprising:
importing external data values into said all audience data, wherein each external datum corresponds to at least one audience layer.

4. The method of claim 1 further comprising:
searching for a data value utilizing an audience layer operator for specifying a set of inheritance levels in which to perform said search.

5. The method of claim 1 further comprising:
editing a first data value having a first visual representation that signifies association with a second audience wherein said first data value is set to a second data value; and,
displaying said second data value with a second visual representation denoting association with said current audience inheritance level.

6. The method of claim 1 further comprising:
editing a first data value having a first visual representation that signifies association with said current audience inheritance level wherein said data value is set to a second data value; and,
generating a second audience specific document comprising audience data corresponding to a second audience inheritance level wherein said first audience specific document and said second audience specific document both result in documents comprising said second data value.

7. The method of claim 1 wherein said generating further comprises formatting said first document for a desired media type.

8. The method of claim 7 wherein said media type is viewable in a browser.

9. The method of claim 7 wherein said media type is paper.

10. The method of claim 1 wherein said obtaining said current audience identifier further comprises obtaining information from an environment variable on a computer associated with said user.

11. The method of claim 1 wherein said obtaining said current audience identifier further comprises obtaining information from a browser session variable.

12. In a computer system, a method for generating an audience specific document utilizing inherited data values comprising:
obtaining a first audience identifier associated with audience data corresponding to a first audience layer;
obtaining said audience data associated with said first audience layer from a database;
presenting a user interface, displaying said audience data wherein at least one first datum of said audience data is annotated with at least one of a plurality of visual representations indicating said first datum's correspondence to said first audience layer;
displaying a second datum of said audience data annotated with a second said at least one of a plurality of visual representations indicating said second datum's correspondence to a second audience layer, where said second audience layer is superior said first audience layer in an audience hierarchy; and
generating a first audience specific document comprising said audience data corresponding to said first audience layer.

13. The method of claim 12 further comprising:
changing said second visual representation of said second datum to indicate a correspondence with said first audience layer in response to said second datum being edited;
generating a second audience specific document comprising said audience data corresponding to said first audience layer, said second audience specific document further comprising said first datum and said edited second datum;
obtaining a second audience identifier associated with said audience data corresponding to said second audience layer;
generating a third audience specific document comprising said audience data corresponding to said second audience layer, said third audience specific document further comprising said first datum and an original value of said second datum.

14. he method of claim 12 wherein said generating said second audience specific document further comprises formatting said second audience specific document for a different media type than said first audience specific document.

15. A computer-accessible memory medium comprising program instructions for determining if audience data for use in generating an audience specific document conforms to requirements of an intended audience, wherein the program instructions are executable to:
display a user interface, said interface further comprising:
a selection widget for selecting an audience identifier;
a first data display capable of displaying a representation of an audience hierarchy;
a second data display comprising a plurality of data fields capable of displaying audience data;
obtain said audience data from a data storage device;
populate said first data display with a representation of said audience data as said audience hierarchy indicative of a plurality of audience inheritance levels;
populate said second data display with a subset of said audience data, each datum selected as determined by its said audience inheritance level relative to said audience identifier;
display indicia of audience inheritance level relative to said audience identifier for at least one of said audience datum on said user interface.

16. The computer-accessible memory medium of claim 15 further comprising program instructions to:
generate an audience document in a plurality of media types.

17. The computer-accessible memory medium of claim 15 further comprising program instructions wherein said user interface further comprises an editing interface for editing said audience data.

* * * * *